(12) United States Patent
Yoon et al.

(10) Patent No.: US 10,275,147 B2
(45) Date of Patent: *Apr. 30, 2019

(54) MOBILE DEVICE AND CONTROL METHOD THEREOF

(71) Applicant: SAMSUNG ELECTRONICS CO., LTD., Suwon-si (KR)

(72) Inventors: Jong-hyun Yoon, Seoul (KR); Sang-su Nam, Seoul (KR); Jae-min Ahn, Seoul (KR); Dae-sung Cho, Suwon-si (KR); Hyun-gyoo Yook, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 278 days.

This patent is subject to a terminal disclaimer.

(21) Appl. No.: 14/542,099

(22) Filed: Nov. 14, 2014

(65) Prior Publication Data

US 2015/0071229 A1 Mar. 12, 2015

Related U.S. Application Data

(63) Continuation of application No. 12/958,007, filed on Dec. 1, 2010, now Pat. No. 8,904,017.

(Continued)

(30) Foreign Application Priority Data

Nov. 22, 2010 (KR) .................. 10-2010-0116091

(51) Int. Cl.
*G06F 3/01* (2006.01)
*G06F 3/0488* (2013.01)
(Continued)

(52) U.S. Cl.
CPC .......... *G06F 3/04883* (2013.01); *G06F 3/016* (2013.01); *G06F 3/017* (2013.01);
(Continued)

(58) Field of Classification Search
CPC ............................... H04W 76/02; H04W 8/18
(Continued)

(56) References Cited

U.S. PATENT DOCUMENTS

| 6,175,789 B1 | 1/2001 | Beckert et al. |
| 6,757,269 B2 | 6/2004 | Dorenbosch et al. |

(Continued)

FOREIGN PATENT DOCUMENTS

| CN | 101325769 A | 12/2008 |
| CN | 101388819 A | 3/2009 |

(Continued)

OTHER PUBLICATIONS

International Search Report [PCT/ISA/210] issued by the International Searching Authority in International Application No. PCT/KR2010/008602 dated Aug. 23, 2011.

(Continued)

*Primary Examiner* — Gary Mui
(74) *Attorney, Agent, or Firm* — Sughrue Mion, PLLC

(57) ABSTRACT

A method includes: executing an application prepared by an application programming interface (API) of a platform; and establishing a network connection. A first network connection is selected based on a determination that the application specifies a network connection, or a default network connection is selected, based on a determination that the application does not specify a network connection.

19 Claims, 6 Drawing Sheets

Related U.S. Application Data

(60) Provisional application No. 61/265,923, filed on Dec. 2, 2009, provisional application No. 61/265,939, filed on Dec. 2, 2009.

(51) Int. Cl.

| | | |
|---|---|---|
| *H04M 1/725* | (2006.01) | |
| *G06F 3/0481* | (2013.01) | |
| *G06F 3/0482* | (2013.01) | |
| *H04W 8/18* | (2009.01) | |
| *G06F 3/0483* | (2013.01) | |
| *G06F 9/451* | (2018.01) | |
| *H04W 76/10* | (2018.01) | |
| *H04M 19/04* | (2006.01) | |
| *H04W 88/02* | (2009.01) | |
| *H04W 84/12* | (2009.01) | |
| *G07F 17/32* | (2006.01) | |
| *H04M 1/2745* | (2006.01) | |

(52) U.S. Cl.
CPC .......... *G06F 3/0481* (2013.01); *G06F 3/0482* (2013.01); *G06F 3/0483* (2013.01); *G06F 3/0488* (2013.01); *G06F 3/04886* (2013.01); *G06F 9/451* (2018.02); *H04M 1/72583* (2013.01); *H04W 8/18* (2013.01); *H04W 76/10* (2018.02); *G07F 17/32* (2013.01); *H04M 1/274525* (2013.01); *H04M 1/72525* (2013.01); *H04M 1/72561* (2013.01); *H04M 19/047* (2013.01); *H04M 2250/22* (2013.01); *H04W 84/12* (2013.01); *H04W 88/02* (2013.01)

(58) Field of Classification Search
USPC ...................................................... 370/329
See application file for complete search history.

(56) References Cited

U.S. PATENT DOCUMENTS

| | | | |
|---|---|---|---|
| 6,775,267 B1 | 8/2004 | Kung et al. | |
| 7,672,695 B1 | 3/2010 | Rainnie et al. | |
| 7,761,607 B2* | 7/2010 | Hassan | H04L 12/5692 370/465 |
| 8,467,390 B2* | 6/2013 | Persson | H04L 47/10 370/392 |
| 8,516,096 B2 | 8/2013 | LeBlanc et al. | |
| 8,687,547 B2* | 4/2014 | Collingrige | 370/328 |
| 8,774,169 B2* | 7/2014 | Anchan | H04W 28/24 370/352 |
| 2002/0176366 A1* | 11/2002 | Ayyagari | H04L 63/08 370/245 |
| 2003/0100308 A1 | 5/2003 | Rusch | |
| 2004/0097228 A1 | 5/2004 | Saada | |
| 2004/0131078 A1* | 7/2004 | Gupta | H04L 12/5692 370/466 |
| 2004/0233930 A1 | 11/2004 | Colby, Jr. | |
| 2004/0264402 A9 | 12/2004 | Whitmore et al. | |
| 2005/0060425 A1 | 3/2005 | Yeh et al. | |
| 2005/0090292 A1 | 4/2005 | Yasutake | |
| 2005/0102631 A1 | 5/2005 | Andreas et al. | |
| 2005/0128968 A1 | 6/2005 | Yang | |
| 2005/0149204 A1* | 7/2005 | Manchester | H04L 29/06 700/1 |
| 2005/0195390 A1 | 9/2005 | Jeon et al. | |
| 2005/0227692 A1* | 10/2005 | Kawashima | H04W 36/365 455/435.2 |
| 2005/0228870 A1 | 10/2005 | de Boor et al. | |
| 2005/0238046 A1 | 10/2005 | Hassan et al. | |
| 2005/0239443 A1* | 10/2005 | Watanabe | H04L 12/5692 455/414.1 |
| 2006/0015636 A1 | 1/2006 | Skraba et al. | |
| 2006/0031784 A1 | 2/2006 | Makela | |
| 2006/0039335 A1 | 2/2006 | Ono et al. | |
| 2006/0126649 A1 | 6/2006 | Akiyoshi | |
| 2006/0239206 A1* | 10/2006 | Rao | H04L 29/12207 370/254 |
| 2006/0245358 A1* | 11/2006 | Beverly | H04L 47/10 370/235 |
| 2006/0258353 A1 | 11/2006 | Makela et al. | |
| 2006/0288329 A1 | 12/2006 | Gandhi et al. | |
| 2007/0004393 A1 | 1/2007 | Forsberg et al. | |
| 2007/0011665 A1 | 1/2007 | Gandhi et al. | |
| 2007/0097877 A1* | 5/2007 | Hoekstra | H04W 48/18 370/252 |
| 2008/0039079 A1 | 2/2008 | Iyer et al. | |
| 2008/0056212 A1 | 3/2008 | Karaoguz et al. | |
| 2008/0086529 A1* | 4/2008 | Lu | H04L 63/101 709/204 |
| 2008/0109877 A1 | 5/2008 | Park et al. | |
| 2008/0127225 A1* | 5/2008 | Mullis | G06F 9/4413 719/321 |
| 2008/0160967 A1 | 7/2008 | Narasimhan et al. | |
| 2008/0299960 A1 | 12/2008 | Lockhart et al. | |
| 2009/0011738 A1* | 1/2009 | Sasakura | G06F 21/6218 455/410 |
| 2009/0143061 A1 | 6/2009 | Wu et al. | |
| 2009/0245215 A1 | 10/2009 | Oshime | |
| 2009/0254639 A1 | 10/2009 | Manchester et al. | |
| 2009/0285190 A1* | 11/2009 | Baron | H04L 12/2867 370/338 |
| 2009/0310509 A1 | 12/2009 | Kumai et al. | |
| 2010/0008291 A1* | 1/2010 | LeBlanc | H04L 45/24 370/328 |
| 2010/0022243 A1* | 1/2010 | Oommen | H04W 48/18 455/435.3 |
| 2010/0142542 A1* | 6/2010 | Van Wie | H04L 65/1073 370/400 |
| 2010/0150001 A1 | 6/2010 | Tsuchiya | |
| 2010/0235523 A1* | 9/2010 | Garcia | H04L 12/1822 709/228 |
| 2011/0058541 A1* | 3/2011 | Fok | H04W 48/18 370/338 |
| 2015/0334087 A1* | 11/2015 | Dawes | H04L 63/02 726/12 |

FOREIGN PATENT DOCUMENTS

| | | |
|---|---|---|
| JP | 200672969 A | 3/2006 |
| JP | 2006074295 A | 3/2006 |
| KR | 10-2006-0058590 A | 5/2006 |
| KR | 10-2006-0076546 A | 7/2006 |
| KR | 10-2007-0095048 A | 9/2007 |
| KR | 10-2009-0121435 A | 11/2009 |
| WO | 2006109159 A2 | 10/2006 |
| WO | 2008032479 A1 | 3/2008 |

OTHER PUBLICATIONS

Communication, dated Jun. 25, 2014, issued by the State Intellectual Property Office of P.R. China in counterpart Patent Application No. 201080054231.0.
Communication, dated Sep. 9, 2014, issued by the Japanese Patent Office in counterpart Patent Application No. 2012-541945.
Communication dated Oct. 9, 2014 issued by the Australian Government IP Australia in counterpart Australian Patent Application No. 2010327451.
Office Action dated Jun. 21, 2012, issued by the U.S. Patent and Trademark Office in parent U.S. Appl. No. 12/958,007.
Office Action dated Nov. 8, 2012, issued by the U.S. Patent and Trademark Office in parent U.S. Appl. No. 12/958,007.
Office Action dated May 17, 2013, issued by the U.S. Patent and Trademark Office in parent U.S. Appl. No. 12/958,007.
Office Action dated Nov. 4, 2013, issued by the U.S. Patent and Trademark Office in parent U.S. Appl. No. 12/958,007.
Office Action dated Feb. 24, 2014, issued by the U.S. Patent and Trademark Office in parent U.S. Appl. No. 12/958,007.

(56) References Cited

OTHER PUBLICATIONS

Notice of Allowance dated Jul. 25, 2014, issued by the U.S. Patent and Trademark Office in parent U.S. Appl. No. 12/958,007.
Communication dated Feb. 26, 2015 issued by European Patent Office in counterpart European Application No. 10834787.3.
Communication dated Feb. 6, 2015 issued by The State Intellectual Property Office of the People's Republic of China in counterpart Chinese Patent Application No. 201080054231.0.
Communication dated Mar. 22, 2016 issued by the Japanese Patent Office in counterpart Japanese Patent Application No. 2012-541945.
Communication dated May 19, 2015, issued by the Japanese Intellectual Property Office in counterpart Japanese Application No. 2012-541945.
Iain Campbel et al.; "SymbianOS Communications Programming", Feb. 12, 2008, Second Edition, Total 489 pages.
Communication dated Jul. 28, 2015, issued by the Japanese Patent Office in counterpart Japanese Application No. 2012-541948.
Communication dated Sep. 19, 2016, issued by the Korean Intellectual Property Office in counterpart Korean Application No. 10-2010-0116091.
Communication dated Mar. 18, 2019, issued by the European Patent Office issued in counterpart European Application No. 10834787.3, 8 pages.

\* cited by examiner

MOBILE DEVICE AND CONTROL METHOD THEREOF

CROSS-REFERENCE TO RELATED APPLICATIONS

This application is a continuation of U.S. patent application Ser. No. 12/958,007, filed on Dec. 1, 2010, which claims priority from U.S. Patent Provisional Application Nos. 61/265,923 and 61/265,939, filed Dec. 2, 2009, and from Korean Patent Application No. 10-2010-0116091 filed Nov. 22, 2010, in the Korean Intellectual Property Office, the disclosures of which are incorporated herein by reference in their entireties.

BACKGROUND

1. Field

Apparatuses and methods consistent with exemplary embodiments relate to a mobile device and a control method thereof, and more particularly, to a mobile device capable of providing a network function and a control method thereof.

2. Description of the Related Art

A mobile device such as a cellular phone, a smart phone, a tablet personal computer (PC), etc. performs communication through various networks such as third generation (3G), Wi-Fi, etc. Such various networks have their merits and deficiencies regarding connectivity, speed, costs, etc. Thus, it is desirable to selectively use various networks in accordance with purpose or intention.

Meanwhile, an application of a mobile device often uses a network service supported by an operating system (OS), a platform or the like of the mobile device in order to provide a function useful to a user.

However, the OS, the platform, or the like of a related art mobile device does not sufficiently support an application developer to conveniently develop an application in association with the network. Therefore, enhancement of an application developing environment is desirous.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

One or more exemplary embodiments provide a mobile device capable of providing a developing environment in which a preferred network can be more easily set up, and a control method thereof.

According to an aspect of an exemplary embodiment, there is provided a mobile device providing a network function, the mobile device including a display unit which displays an image; a user input unit which receives an input of a user; a communication unit which performs communication through a network; and a control unit which executes an application prepared by an application programming interface (API) of the network function provided by a platform, and controls the communication unit to perform communication in accordance with setup of a preferred network if the application includes the setup of the preferred network.

The platform may define a plurality of operation modes related to the preferred network, the application may include setup of a variable representing one of the plurality of operation modes, and the control unit may control the communication unit to operate in the operation mode corresponding to the setup of the variable.

The plurality of operation modes may include use of Wi-Fi first, use of only a packet switched (PS) domain, and use of only Wi-Fi.

A network connection by the platform may include a default network connection where the application does not specify the network connection, and a custom network connection where the application is enabled to directly control the network, and the control unit may control the communication unit to perform communication in accordance with the setup of the preferred network in the case of the default network connection.

According to another aspect of an exemplary embodiment, there is provided a control method of a mobile device providing a network function, the control method including executing an application prepared by an API provided by a platform of the mobile device; and performing communication in accordance with setup of a preferred network if the application includes the setup of the preferred network.

The platform may define a plurality of operation modes related to the preferred network, the application may include setup of a variable representing one of the plurality of operation modes, and the performing the communication may include performing communication to operate in the operation mode corresponding to the setup of the variable.

The plurality of operation modes may include use of Wi-Fi first, use of only a PS domain, and use of only Wi-Fi.

A network connection by the platform may include a default network connection where the application does not specify the network connection, and a custom network connection where the application is enabled to directly control the network, and the performing the communication may include performing the communication in accordance with the setup of the preferred network in the case of the default network connection.

BRIEF DESCRIPTION OF THE DRAWINGS

The above and/or other aspects will become more apparent from the following description of exemplary embodiments, taken in conjunction with the accompanying drawings, in which.

DETAILED DESCRIPTION OF EXEMPLARY EMBODIMENTS

Figure 1:
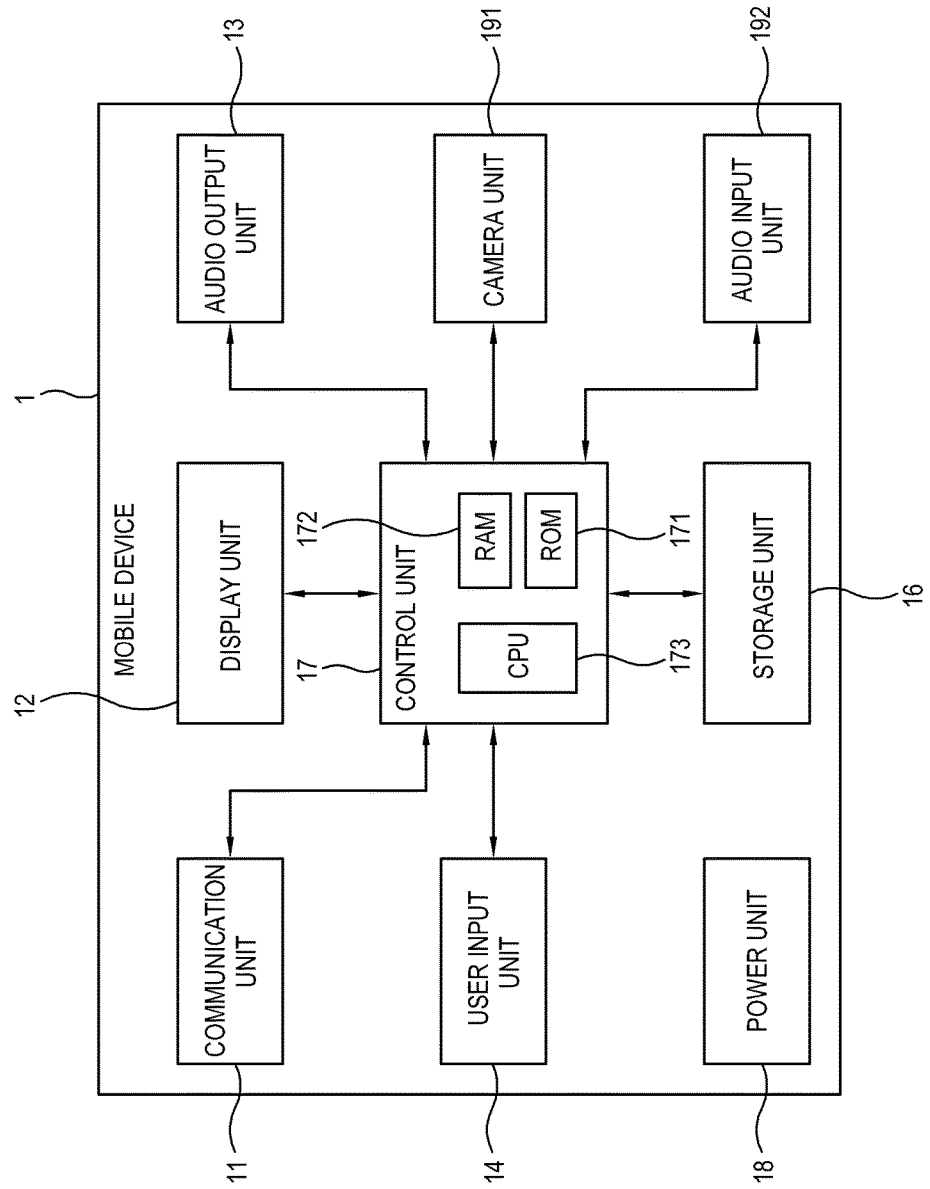
FIG. 1 is a block diagram showing a configuration of a mobile device according to an exemplary embodiment.

Certain exemplary embodiments are described in greater detail below with reference to accompanying drawings.

In the following description, like drawing reference numerals are used for like elements, even in different drawings. The matters defined in the description, such as detailed construction and elements, are provided to assist in a comprehensive understanding of exemplary embodiments. However, exemplary embodiments can be practiced without those specifically defined matters.

FIG. 1 is a block diagram showing a configuration of a mobile device according to an exemplary embodiment. The mobile device 1 shown in FIG. 1 may include, for example, a cellular phone, a smart phone, a tablet personal computer (PC), etc. The mobile device 1 may include a communication unit 11, a display unit 12, an audio output unit 13, a user input unit 14, a storage unit 16, a control unit 17, a power unit 18, a camera unit 191, and an audio input unit 192.

The communication unit 11 performs communication through a network. The contents and type of the communication performed by the communication unit 11 may vary depending on use and function of the mobile device 1. For example, in the case of a telephone function, the communication unit 11 calls the other device (not shown) for telephone conversation. In this exemplary embodiment, the calling type includes 3G. In the case of an Internet function, the communication unit 11 performs Internet connection with a predetermined server (not shown) for transmitting/receiving data. Further, the communication unit 11 may perform communication with a peripheral device (not shown) through local communication such as Bluetooth, WiFi, etc. The communication unit 11 performs the communication under control of the control unit 17.

The display unit 12 displays an image representing the operation or state of the mobile device 1. The display unit 12 may display an image by using various display devices including, for example, a liquid crystal display (LCD), an organic light emitting device (OLED), etc. The audio output unit 13 outputs an audio representing the operation or state of the mobile device 1. The audio output unit 13 may include an audio processor (not shown) that processes an audio signal, and a loudspeaker (not shown) that outputs an audio based on an audio signal.

The user input unit 14 receives a user's command. The user input unit 14 may receive a user's command in various forms, which may include a key input unit (not shown) that receives a user's command by a key input, and a touch input unit (not shown) that receives a user's command by a touch input. A touch input unit may include a touch screen provided in the display unit 12.

The storage unit 16 is a non-volatile memory including, for example, a flash memory, a hard disk drive, etc., which stores data or programs for operating the mobile device 1. The power unit 18 supplies power for operating the mobile device 1. The camera unit 191 takes an image, and the audio input unit 192 may include a microphone or the like and receives an audio. Some of the above-described elements, for example, the camera unit 191, or the like may be omitted from the mobile device 1 in consideration of its function or use.

Figure 2:
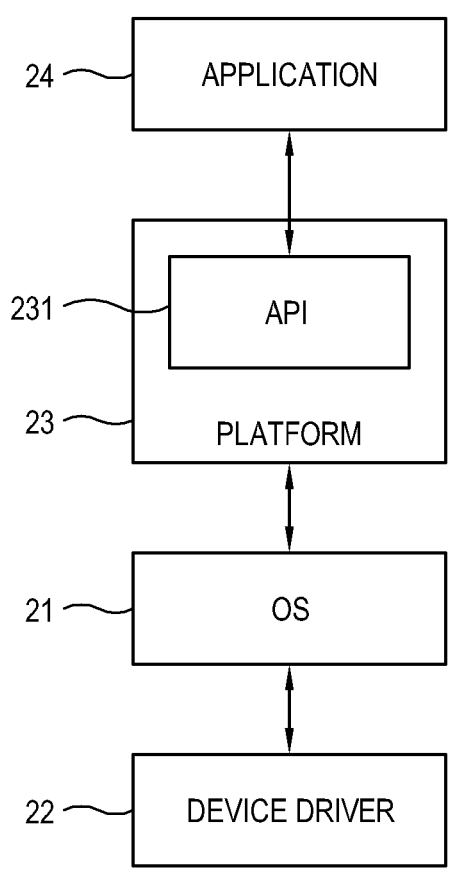
FIG. 2 is a block diagram showing a software configuration of the mobile device of FIG. 1.

The control unit 17 controls the operation of the elements in the mobile device 1. The control unit 17 may include a read only memory (ROM) 171 where a control program for performing an operation is stored, a random access memory (RAM) 172 where the control program is at least partially loaded, and a central processing unit (CPU) 173 which executes the loaded control program. The control program of the control unit 17 may be stored in the storage unit 16 as well as in the ROM 171. The control program of the control unit 17 may include a plurality of programs. FIG. 2 is a block diagram showing an exemplary configuration of the control program in the control unit 17.

As shown in FIG. 2, the control program of the control unit 17 may include an OS 21, a device driver 22, a platform 23, and an application 24. The OS 21 manages and controls overall operations of the mobile device 1. The device driver 22 performs an interface between a hardware device such as the communication unit 16 and the OS 21. The platform 23 performs an interface between the OS 21 and the application 24, and includes an API 231 for supporting the application 24.

The application 24 performs at least one function, and may be prepared using the API 231 of the platform 23. The function performed by the application 24 includes a network function. The application 24 may be transmitted from the external device through the communication unit 11 and installed on the mobile device 1. That is, a user can download the application 24 via the Internet or the like and install it on the mobile device 1.

The API 231 of the platform 23 includes an API for the network function which is also referred to as a network service. For example, a network connection representing an actual run-time session is initially established for transmitting and receiving data through a network using the platform 23. To set up the network connection, a network account may be used. The network account encapsulates configuration parameters such as a protocol type, an access point name, a local Internet protocol (IP) address, a domain name system (DNS) address, authentication information, etc. After the network connection is successfully established, a data communication protocol such as a hyper text transfer protocol (HTTP), socket methods, etc. may be applied.

Figure 3:
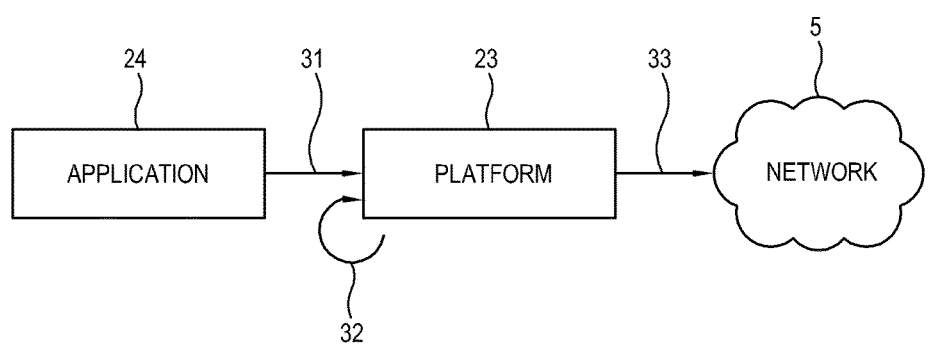
FIGS. 3 and 4 show network connection types of the mobile device according to an exemplary embodiment.
Figure 4:
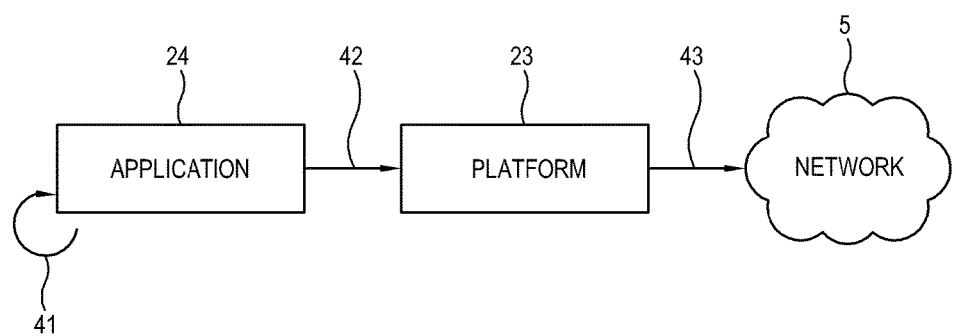

FIGS. 3 and 4 show network connection types of the mobile device according to an exemplary embodiment. FIG. 3 shows a default network connection, and FIG. 4 shows a custom network connection.

Referring to FIG. 3, the application 24 requests a network service of the platform 23 without a network connection via a request 31. The network service (e.g., HTTP, socket methods, etc.) internally starts the default network connection in accordance with a preset default (as indicated by a reference numeral 32. Next, the network service of the platform 23 accesses a network 5 via a connection 33.

The default network connection shown in FIG. 3 is established because the application 24 does not specify the network connection, and therefore usage of the network is simplified in view of the application developer. Also, the platform 23 is allowed to fully manage the network connection. Thus, the application developers can easily and simply develop the application 24 even though they do not know complicated contents of the API 231.

Referring to FIG. 4, the application 24 creates the custom network connection and starts it as indicated by a reference numeral 41. Program 1 shows an example of the application 24 that creates and starts a custom network connection.

```
Program 1
// start the NetConnection
    using namespace Osp::Net;
    void
    Test(void)
    {
        // Account ID
        NetAccountId accountId = INVALID_HANDLE;
        result r = E_SUCCESS;
        // Account manager
        NetAccountManager netAccountManager;
        r = netAccountManager.Construct( );
        accountId =
netAccountManager.GetNetAccountId( );
        // Construct a Listener
        TestListener* pMyListener = new TestListener( );
        // NetConnection instance allocation
        NetConnection* pNetConnection = new
NetConnection;
```

-continued

```
// NetConnection Construction
r = pNetConnection->Construct(accountId);
// ___NetConnectionEvent AddListener
r = pNetConnection-
>AddNetConnectionListener(pMyListener);
// NetConnection connect
r = pNetConnection->Start( );
}
```

Referring back to FIG. 4, the application 24 requests a network service of the platform 23 with a network connection via a request 42. Next, the network service of the platform 23 accesses the network 5 via a connection 43.

The custom network connection described with reference to FIG. 4 may be for an advanced developer, and enables the application 24 to directly control the network 5. Thus, the application 24 can use a specific network account, and start or stop the network connection at any time. That is, the application developer is allowed to develop the application 24 that provides a more enhanced function.

Figure 5:
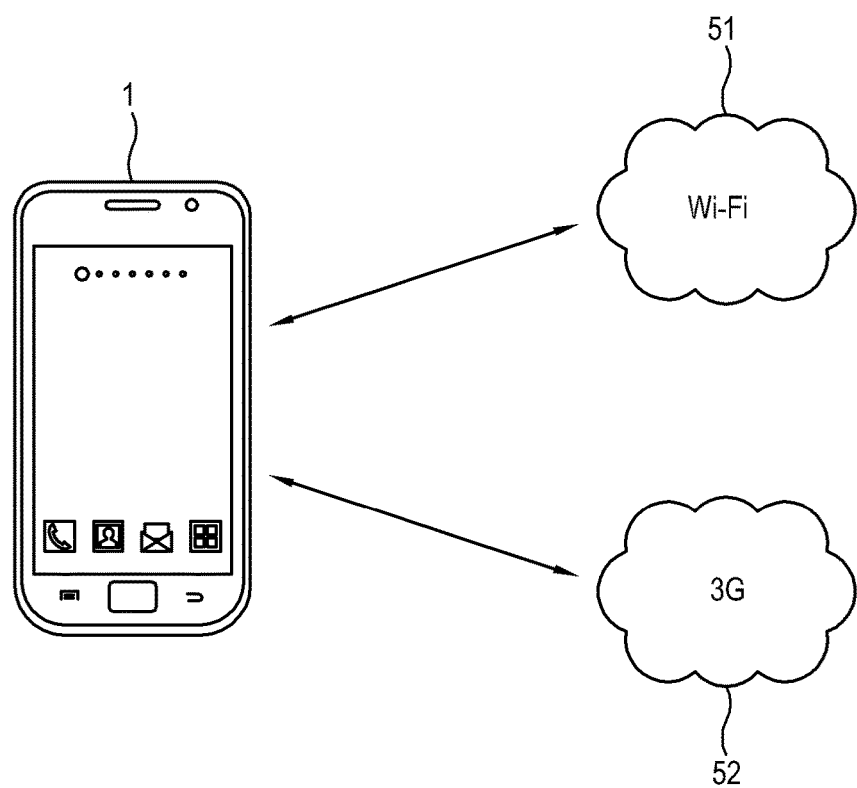
FIG. 5 is a view for explaining a preferred network of the mobile device according to an exemplary embodiment.

The control unit 17 of an exemplary embodiment may enable the developer to perform communication with a desired network which may be referred to as a preferred network in accordance with a setup of the application 24. FIG. 5 is a view for explaining a preferred network of the mobile device in this exemplary embodiment. The preferred network in this exemplary embodiment includes Wi-Fi 51 and 3G 52. The 3G is an example of a PS domain. The control unit 17 may be connected to one of the preferred networks, i.e., the Wi-Fi 51 and the 3G 52 in accordance with the setup of the application 24.

The API 231 of the platform 23 defines a plurality of operation modes related to the preferred network. The application 24 includes setup of variables that represents one of the operation modes defined by the API 231 of the platform 23. Table 1 shows an example of variables corresponding to the operation modes related to the preferred network of the present exemplary embodiment, and Program 2 shows an example of the application 24 that sets up the preferred network. The platform 23 accomplishes connection to one preferred network between the Wi-Fi 51 and the 3G 52 with reference to the variables set up in the application 24.

TABLE 1

| Variables | Operation modes |
|---|---|
| NET_WIFI_FIRST | Use of WI-FI first |
| NET_PS_ONLY | Use of only PS domain |
| NET_WIFI_ONLY | Use of only Wi-Fi |

Program 2
Net::NetAccountManager::Construct( )
Net::NetAccountManager::SetNetPreference(NET_PS_ONLY)

In this exemplary embodiment, the platform 23 provides the foregoing simple API 231 in association with the preferred network, so that the application developer can readily perform the setup related to the preferred network by simply selecting the given variable of the API 231. Also, the setup of the preferred network may be applied to the default network connection described with reference to FIG. 3. In other words, although the application developer does not completely know the API 231 to accomplish the custom network connection described with reference to FIG. 4, the developer is enabled to set up the preferred network even when the default network connection is used. Accordingly, there is provided an environment for more easily developing the application 24.

Figure 6:
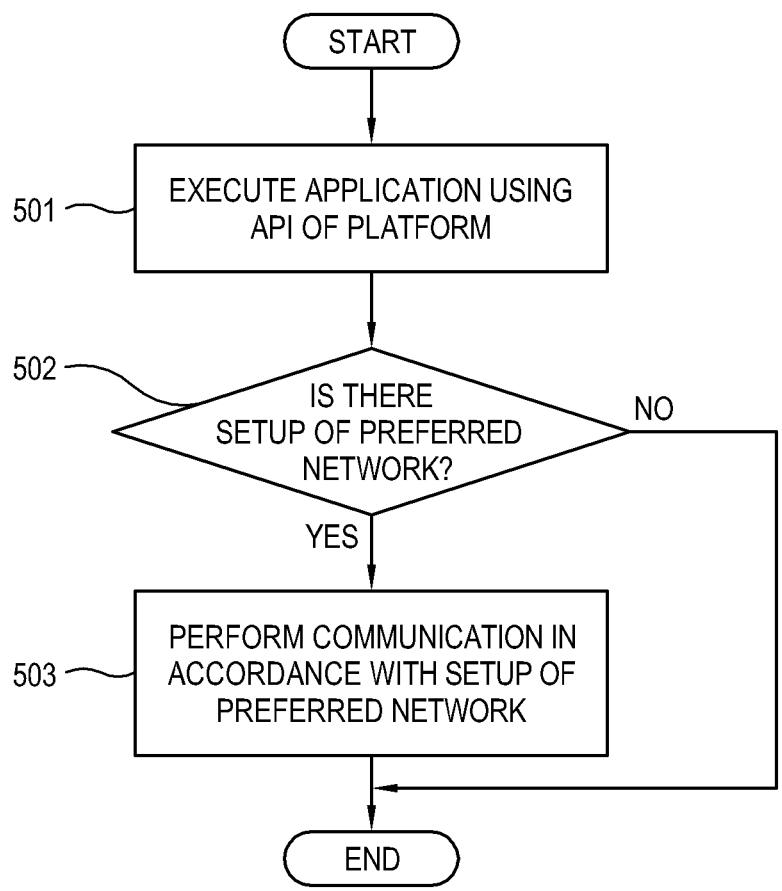
FIG. 6 is a flowchart showing an operation of the mobile device according to an exemplary embodiment.

FIG. 6 is a flowchart showing an operation of the mobile device according to an exemplary embodiment. At operation 501, the application 24 using the API 231 of the platform is executed. At operation 502, it is ascertained whether the application 24 includes setup related to the preferred network. If the application 24 includes the setup related to the preferred network, at operation 503 the communication is performed in accordance with the setup of the preferred network.

As described above, there is provided a developing environment in which a preferred network can be more easily set up.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method comprising:
executing an application prepared by an application programming interface (API) of a platform;
if the executed application is associated with first network setting information, establishing a first network connection based on a first operation mode among a plurality of operation modes which are defined in the platform, the first operation mode defining network setting information of the executed application and specifying the first network connection; and
if the executed application is associated with second network setting information, requesting a network service of the platform based on a determination that a second network connection is not established, and, in response to the requesting, starting the second network connection via the platform based on a second operation mode among the plurality of operation modes, the second operation mode defining network setting information of the platform and specifying the second network connection.

2. The method of claim 1, wherein the establishing the first network connection comprises:
establishing the first network connection based on the first operation mode being set up in the application via the API.

3. The method of claim 2, wherein the plurality of operation modes comprises at least two among:
a use of Wi-Fi first;
a use of only a packet switched (PS) domain; and
a use of only the Wi-Fi.

4. The method of claim 2, further comprising:
requesting the network service of the platform with the first network connection; and
accessing a network based at least on the requesting.

5. The method of claim 1, wherein the starting the second network connection further comprises:
accessing a network, via the second network connection.

6. The method of claim 1, further comprising:
displaying an information corresponding to the network service.

7. The method of claim 1, further comprising:
prior to the executing the application, establishing the network service by using the second network connection.

8. An apparatus comprising:
a processor;
a display to display an information corresponding to a network service; and
a communication unit coupled to the processor and controlled by the processor to communicate with an electronic device external to the apparatus through a network,
wherein the processor is configured to:
execute an application prepared by an application programming interface (API) of a platform,
establish a first network connection via the communication unit, if the executed application is associated with first network setting information, based on network setting information of the executed application specifying the first network connection, the first network connection being managed by the application, and
use a second network connection via the communication unit, if the executed application is associated with second network setting information, based on network setting information of the platform specifying the second network connection,
wherein the processor is further configured to use the second network connection based at least on a preferred network being set up in the platform.

9. The apparatus of claim 8, further comprising:
a user input unit which is operatively coupled with the processor and configured to receive, from a user, an input corresponding to the application.

10. The apparatus of claim 8, wherein the processor is further configured to:
establish the first network connection, based on one of a plurality of operation modes which are defined in the platform, the one of the plurality of operation modes being set up in the application via the API.

11. The apparatus of claim 10, wherein the plurality of operation modes comprises at least two among:
a mode to provide a Wi-Fi first,
a mode to provide only a packet switched (PS) domain, and
a mode to provide only the Wi-Fi.

12. The apparatus of claim 10, wherein:
the application includes at least one variable corresponding to the one of the plurality of operation modes.

13. The apparatus of claim 10, wherein the application is configured to directly control the network.

14. The apparatus of claim 13, wherein the application is configured to start and stop the first network connection via the platform.

15. The apparatus of claim 10, wherein the processor is further configured to request the network service of the platform with the first network connection, and access the network based at least on a request for the network service.

16. The apparatus of claim 10, wherein the processor is further configured to request the network service, without a network connection, and use the second network connection via the platform, based at least on a request for the network service.

17. The apparatus of claim 8, wherein the processor is further configured to establish the network service by using the second network connection prior to performing an execution of the application.

18. An apparatus comprising:
a processor;
a display to display an information corresponding to a network service; and
a communication unit coupled to the processor and controlled by the processor to communicate with an electronic device external to the apparatus through a network,
wherein the processor is configured to:
execute an application prepared by an application programming interface (API) of a platform,
establish a first network connection via the communication unit, if the executed application is associated with first network setting information, based on a first operation mode among a plurality of operation modes which are defined in the platform, the first operation mode defining network setting information of the executed application and specifying the first network connection, the first network connection being managed by the application, and
request the network service of the platform based on a determination that a second network connection is not established, and, in response to requesting, start the second network connection via the communication unit, if the executed application is not associated with the first network setting information, based on a second operation mode among the plurality of operation modes, the second operation mode defining network setting information of the platform and specifying the second network connection.

19. The apparatus of claim 18, wherein the processor is further configured to establish the second network connection prior to an execution of the application.

* * * * *